US011542708B2

(12) United States Patent
Pavlovic et al.

(10) Patent No.: US 11,542,708 B2
(45) Date of Patent: Jan. 3, 2023

(54) METHOD FOR MAKING A VIRGIN JOINT BETWEEN TWO SEPARATE STRUCTURAL HOLLOW SECTIONS, AND SUCH A VIRGIN JOINT

(71) Applicant: Technische Universiteit Delft, Delft (NL)

(72) Inventors: Marko Pavlovic, Delft (NL); Peter Bogers, Delft (NL); Milan Veljkovic, Delft (NL)

(73) Assignee: Technische Universiteit Delft, Delft (NL)

( * ) Notice: Subject to any disclaimer, the term of this patent is extended or adjusted under 35 U.S.C. 154(b) by 0 days.

(21) Appl. No.: 17/052,303

(22) PCT Filed: Apr. 26, 2019

(86) PCT No.: PCT/NL2019/050245
§ 371 (c)(1),
(2) Date: Nov. 2, 2020

(87) PCT Pub. No.: WO2019/212334
PCT Pub. Date: Nov. 7, 2019

(65) Prior Publication Data
US 2021/0079651 A1    Mar. 18, 2021

(30) Foreign Application Priority Data
May 3, 2018   (NL) ..................... 2020871

(51) Int. Cl.
*E04C 3/08*        (2006.01)
*E04C 3/29*        (2006.01)
(Continued)

(52) U.S. Cl.
CPC ................ *E04C 3/08* (2013.01); *E04C 3/29* (2013.01); *E04B 1/1903* (2013.01);
(Continued)

(58) Field of Classification Search
CPC ...... E04C 3/08; E04C 3/29; E04C 2003/0491; E04B 1/19; E04B 1/1903;
(Continued)

(56) References Cited

U.S. PATENT DOCUMENTS 4,504,086 A * 3/1985 Carrow ................ F16L 41/021
156/172
4,671,470 A * 6/1987 Jonas ..................... B29C 66/54
244/119
(Continued)

FOREIGN PATENT DOCUMENTS

EP          0139500 A2     5/1985

OTHER PUBLICATIONS

Fu et al., "Experimental Study on Behavior of CFRP-Strengthened Circular Hollow Section Gap K-Joints", 6th International Conference on Advances in Experimental Structural Engineering, 11th International Workshop on Advanced Smart Materials and Smart Structures Technology, 2015, pp. 1-7, University of Illinois.

(Continued)

*Primary Examiner* — Theodore V Adamos
(74) *Attorney, Agent, or Firm* — The Webb Law Firm

(57) ABSTRACT

A method of making a virgin joint between at least two separate structural hollow sections in a truss or jacket structure made of the at least two structural hollow sections may include the steps of applying a fiber reinforced polymer wrap around the at least two structural hollow sections in a transitional area, covering and thus bonding together the at least two structural hollow sections, and forming the virgin joint between the at least two structural hollow sections and the fiber reinforced polymer wrap. Welding of the virgin joint between the at least two structural hollow sections is avoided.

25 Claims, 7 Drawing Sheets

(51) Int. Cl.
  *E04B 1/19* (2006.01)
  *E04B 1/24* (2006.01)
  *E04C 3/04* (2006.01)
(52) U.S. Cl.
  CPC ............... *E04B 2001/1975* (2013.01); *E04B 2001/2451* (2013.01); *E04C 2003/0491* (2013.01)
(58) Field of Classification Search
  CPC ..... E04B 2001/1975; E04B 2001/2451; B64C 1/12; F16L 55/1689; F16L 58/1063; F16L 13/10; F16L 4/02
  See application file for complete search history.

(56) References Cited

U.S. PATENT DOCUMENTS

| | | | | |
|---|---|---|---|---|
| 5,472,290 | A * | 12/1995 | Hulls | B62D 33/046 296/181.3 |
| 5,593,744 | A * | 1/1997 | Van Vechten | F16L 9/14 138/103 |
| 5,732,743 | A * | 3/1998 | Livesay | B29C 65/4845 138/99 |
| 6,585,298 | B2 * | 7/2003 | Pålsson | B29C 66/5221 285/294.2 |
| 6,696,174 | B2 * | 2/2004 | Cercone | B23P 6/00 138/97 |
| 9,016,324 | B2 * | 4/2015 | Niccolls | B32B 27/28 138/140 |
| 2002/0053175 | A1 * | 5/2002 | McKague, Jr. | B29C 66/4344 52/309.13 |
| 2003/0180570 | A1 * | 9/2003 | Cercone | B23P 6/00 428/626 |
| 2004/0011927 | A1 * | 1/2004 | Christman | F16B 11/006 244/131 |
| 2005/0108980 | A1 | 5/2005 | Barmakian | |
| 2005/0252153 | A1 * | 11/2005 | Barmakian | E04C 5/166 52/693 |
| 2008/0302912 | A1 * | 12/2008 | Yip | B29C 43/10 244/119 |
| 2010/0243804 | A1 * | 9/2010 | Vera Villares | B29C 66/721 244/119 |
| 2010/0266790 | A1 | 10/2010 | Kusinski et al. | |
| 2010/0304094 | A1 * | 12/2010 | Brook | B64C 1/064 428/174 |
| 2011/0079311 | A1 * | 4/2011 | Lazzara | F16L 58/1063 138/99 |
| 2012/0066994 | A1 * | 3/2012 | Gibson | B29C 70/527 52/309.13 |
| 2016/0279865 | A1 | 9/2016 | Souza et al. | |

OTHER PUBLICATIONS

Lesani et al., "Numerical investigation of FRP-strengthened tubular T-joints under axial compressive loads", Composite Structures, 2013, pp. 71-78, vol. 100.
Lesani et al., "Experimental investigation of FRP-strengthened tubular T-joints under axial compressive loads", Construction and Building Materials, 2014, pp. 243-252, vol. 53.
Lesani et al., "FRP wrapping for the rehabilitation of Circular Hollow Section (CHS) tubular steel connections", Thin-Walled Structures, 2015, pp. 216-234, vol. 90.
Sundarraja et al., "Strengthening of Hollow Square Sections under Compression Using FRP Composites", Advances in Materials Science and Engineering, 2014, pp. 1-19, vol. 2014, Article ID 396597.
Wardenier et al., "Hollow Sections in Structural Applications", Bouwen met Staal, 2010, The Netherlands, pp. 1-8.
Zhao et al., "State-of-the-art review on FRP strengthened steel structures", Engineering Structures, 2007 pp. 1808-1823, vol. 29.
Pantelides et al., "Repair of Cracked Aluminum Overhead Sign Structures with Glass Fiber Reinforced Polymer Composites", Journal of Composites For Construction, 2003, vol. 7:2, pp. 118-126.

* cited by examiner

General layout of the wrapped FRP joint – example of K-joint geometry in an truss/jacket structure made of steel structural hollow sections.

Geometry of wrapped FRP and welded axial and X-joints.

Results of preliminary FEA on axial wrapped FRP joint: influence of the thickness at the splice joint root on the ultimate adhesive resistance of the joint.

Experiment set-up in the testing rig showing LVTDs mounted at the end points of brace members and strain gauges positioned along the wrapped FRP X-joint specimen.

Strain gauges in the zone of splice joint root of specimen A-240-14-1:

a) strain gauges 1-10 inside the steel hollow section;
b) strain gauges 12-21 on the outer surface of the FRP wrap.

Force-displacement behaviour of: a) welded axial (WAS) and; b) X-joints (WXS).

Failure modes of welded axial (WAS) and X-joints (WXS).

Slip failure mode of wrapped FRP axial joint and force-displacement behavior.

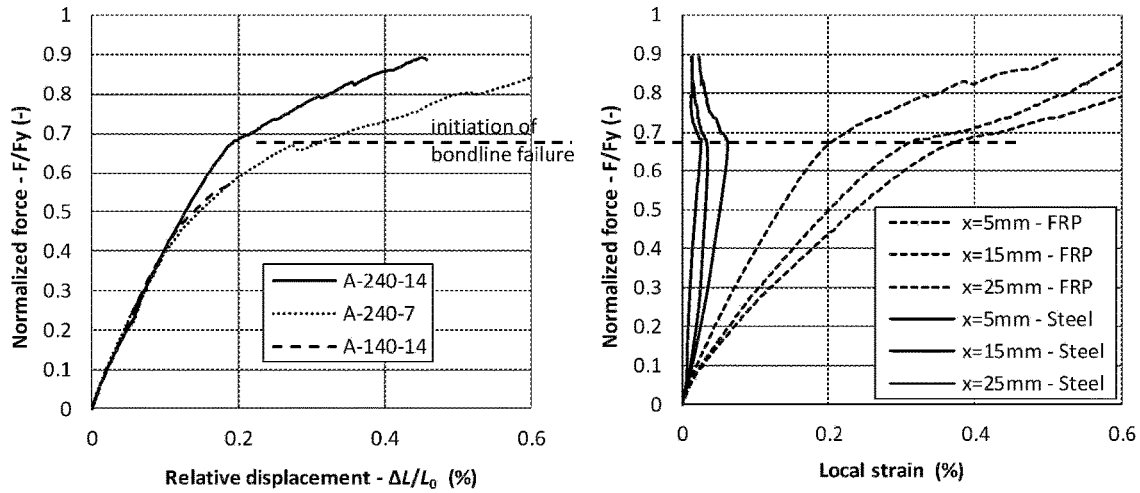

Figure 9:

Development of failure in wrapped FRP axial joints:
a) force-displacement of representative specimens within series;
b) local strains measured in cross sections at distance "x" from the joint root at surface of the FRP wrap and inside steel hollow section - series A-240-14 (for strain gauge positions see Figure 5).

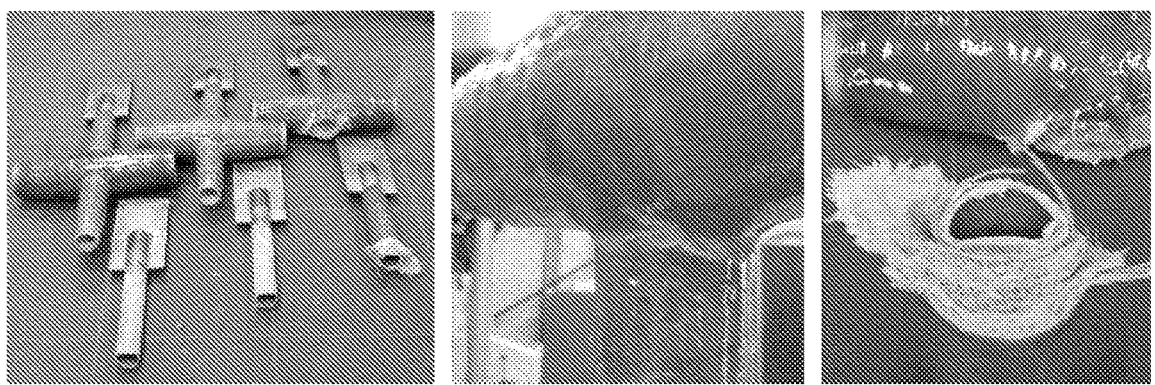

Figure 10:

Failure of wrapped FRP X-joint specimens:
a) Specimens: X-240-14-1, X-240-14-2, X-240-14-3, from left to right;
b) cracks in the FRP wrap at the root of bottom brace member joint (X-24-14-1);
c) failure of the FRP wrap at the joint root in specimen X-240-14-3.

Results of wrapped FRP X-joints:
a) comparison of force-displacement behavior to axial FRP joints and welded X-joints;
b) strains on the surface of the FRP wrap indicating progression of adhesive failure (for strain gauge positions see Figure 4).

METHOD FOR MAKING A VIRGIN JOINT BETWEEN TWO SEPARATE STRUCTURAL HOLLOW SECTIONS, AND SUCH A VIRGIN JOINT

CROSS-REFERENCE TO RELATED APPLICATIONS

This application is the United States national phase of International Application No. PCT/NL2019/050245 filed Apr. 26, 2019, and claims priority to The Netherlands Patent Application No. 2020871 filed May 3, 2018, the disclosures of which are hereby incorporated by reference in their entirety.

BACKGROUND OF THE INVENTION

Field of the Invention

The invention relates to a method for making a virgin joint between two separate structural hollow sections, and relates to such a virgin joint. Normally the structural hollow sections are made of steel, but other materials are feasible as well. In order to differentiate from reconstruction of an existing structural joint, the invention is explicitly limited to the construction of a virgin joint, which is a newly made structural joint.

Description of Related Art

Thin-walled circular or rectangular structural hollow sections (SHS) are a cost effective solution for supporting lattice tower structures used for instance in Off-shore Wind Technology (OWT), oil platforms and in structural bridges. A disadvantage in case that steel or other metals are used for structural hollow sections is that the structures exhibit a relatively low fatigue endurance of the welded joints. The welding process reduces fatigue endurance of the structural hollow sections brace and chord members. The main structural problems are reduced fracture toughness of the material in the heat affected zone of the weld and stress concentration factors due to local notches, eccentricity of the weld and local deformation of thin-walled hollow sections.

Wardenier J., Hollow sections in structural applications, CIDECT, Geneva, 2010 teaches that stress concentration factors for Circular Hollow Section (CHS) joints are in range of 2 to 40 depending on welding technology, joint geometry and steel structural hollow section diameters and thicknesses.

The welding costs are furthermore dominant in fabrication of steel jacket structures as for instance used for offshore platform and wind turbines. In addition thicker profiles need to be used to satisfy fatigue endurance driven design of such structures.

Use of higher grade steels (HSS) could lead to large reduction of thickness and therefore weight of the supporting structures in offshore applications and longer spans of truss steel bridges. However, because of limited fatigue endurance, which is the governing design criterion, the application of HSS is hindered.

Nowadays, the safe and durable design is achieved by increasing the thickness of the base material or by improved welding technologies which generate high fabrication costs.

Casted joint are an alternative solution which is very expensive and the problems with the fatigue still remain at the connection of the casted joint and the brace/chord member.

As another development the article "Experimental Study on Behavior of CFRP-Strengthened Circular Hollow Section Gap K-Joints", presented at the 6th International Conference on Advances in Experimental Structural Engineering Aug. 1-2, 2015, University of Illinois, Urbana-Champaign, United States, discloses the application of Fiber Reinforced Polymer (FRP) to promote the joint capacity of general tubular K-joints fabricated from undamaged welded circular hollow section members.

The article "Strengthening of Hollow Square Sections under Compression Using FRP Composites", published in Advances in Materials Science and Engineering Volume 2014, Article ID 396597, 19 pages, discloses that the external bonding of normal modulus carbon fiber reinforced polymer (CFRP) strips significantly enhanced the load carrying capacity and stiffness of welded hollow sections and also reduced the axial shortening of columns by providing external confinement against elastic deformation.

Further the results of a numerical and experimental research program can be found on the Internet through the link https://www.researchgate.net/publication/272200210_FRP_wrapping_for_rehabilitation_of_Circular_Hollow_Section_CHS_tubular_steel_connections, wherein it is disclosed that some existing T and Y shaped steel welded tubular connections made of Circular Hollow Sections (CHS) were reinforced by uni-directional glass fibers impregnated with vinyl ester resin and wrapped all around the intersection of the members and the adjacent areas.

And in an article in Engineering Structures 29(8):1808-1823. August 2007 entitled "State-of-the-art review of FRP strengthened steel structures" it is disclosed that the use of FRP (Fibre Reinforced Polymer) to strengthen existing welded steel structural hollow sections has become an attractive option which may produce confident retrofitting of existing structures. The article deals with the bond between steel and FRP, the strengthening of steel hollow section members, and fatigue crack propagation in the FRP-Steel system.

In all prior art teachings the problems of welded steel structural hollow section joints that relate to limited fatigue endurance are not solved and require costly solutions in terms of design solutions and high lifetime maintenance costs.

SUMMARY OF THE INVENTION

It is an object of the invention to solve the prior art problem and to propose an alternative solution which is less costly and requires less maintenance.

According to the invention a method for making a virgin joint between two separate structural hollow sections is therefore proposed as well as the configuration of such a virgin joint in accordance with the present disclosure.

Basically the invention proposes a method for making a virgin joint between at least two separate structural hollow sections, wherein welding of the joint between the structural hollow sections is avoided, and wherein the joint is implemented by applying a fiber reinforced polymer wrap around the structural hollow sections in a transitional area covering and thus bonding together those portions of the structural hollow sections that together with the fiber reinforced polymer wrap form the joint between the structural hollow sections.

Accordingly the invention is also embodied in a virgin joint between at least two separate hollow structural sections, wherein the joint excludes any weld and comprises a fiber reinforced polymer wrap around the structural hollow sections in a transitional area covering and thus bonding together those portions of the structural hollow sections that together with the fiber reinforced polymer wrap form the joint between the hollow structural sections. The forces between the structural hollow sections of the joint are transferred by adhesive bonding, friction and mechanical interlocking between the fiber reinforced polymer wrap and the outer surfaces of the structural hollow sections. The fiber reinforced polymer wrap therewith acts as a transition piece for the forces.

Suitably the fiber reinforced polymer wrap is applied in a series of sequential lamination steps.

Preferably the fiber reinforced polymer of the fiber reinforced polymer wrap is provided by mixing a thermoset resin matrix with fabrics and/or rovings of a fiber reinforcement.

The fibre reinforcement can be embodied with glass fibres, carbon fibres, or similar, and the thermo-set resin matrix can be Unsaturated Polyester, Vinyl Ester, Epoxy or similar.

Best results are achieved when the fiber reinforced polymer wrap has a length in the longitudinal direction of the structural hollow sections which is in the range of 0.5-5 times the diameter of the structural hollow sections.

The quality of the joint between the at least two structural hollow sections is further promoted when the fiber reinforced polymer wrap has a thickness, measured transversely to the longitudinal direction of the structural hollow sections, in the range of 0.5-5 times the thickness of the structural hollow sections. The thickness of the FRP wrap is gradually reduced from a maximum thickness tW at the root of the joint towards the end of the FRP wrap as seen in the longitudinal direction of the structural hollow section in order to make a tapered joint, which reduces the stress concentrations at the adhesively bonded interface between the FRP wrap and the structural hollow section. For the same reason the transitions between the structural hollow sections at the root of the joint are made with a smooth geometry.

BRIEF DESCRIPTION OF THE DRAWINGS

The invention will hereinafter be further elucidated with reference to experiments and illustrated by the drawings that are not limiting.

In the drawing it shows in:

FIG. 9: Development of failure in wrapped FRP axial joints: a) force-displacement of representative specimens within series; b) local strains measured in cross sections at distance "x" from the joint root at surface of the FRP wrap and inside steel hollow section—series A-240-14 (for strain gauge positions see FIG. 5).

FIG. 10: Failure of wrapped FRP X-joint specimens: a) Specimens: X-240-14-1, X-240-14-2, X-240-14-3, from left to right; b) cracks in the FRP wrap at the root of bottom brace member joint (X-24-14-1); b) failure of the FRP wrap at the joint root in specimen X-240-14-3;

DETAILED DESCRIPTION OF THE INVENTION

Figure 1:
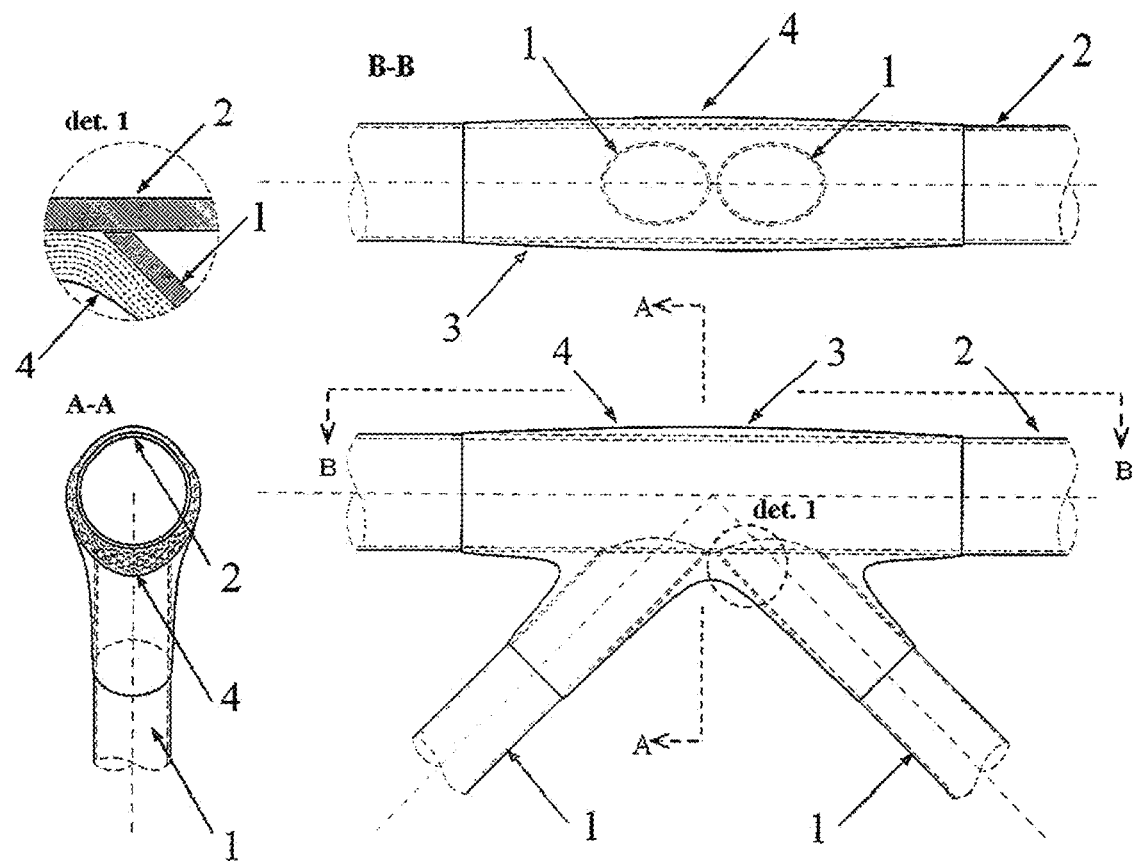
FIG. 1: A general layout of a wrapped FRP joint-example of K-joint geometry in an truss/jacket structure made of structural hollow sections.

FIG. 1 shows a non-limiting general layout of a wrapped FRP joint—example of K-joint geometry in an truss/jacket structure made of structural hollow sections. It will be clear to the skilled person that the invention can be applied to any type of joint, such as K, X, T, N, KT, Y, joints, including combinations of those basic geometries, with gap and with overlap. In addition, the geometry is not limited to uni-planar but also multiplanar joints are covered, for example KK, TT, XX, YY. The joint can in particular be made between at least two separate structural hollow sections in a truss, lattice, jacket, space frame, space grid or any other form of multi member load carrying structure made of such structural hollow sections.

FIG. 1 shows a non-limiting general layout of a wrapped FRP joint—example of K-joint geometry in an truss/jacket structure made of structural hollow sections. It will be clear to the skilled person that the invention can be applied to any type, or shape, of joint, such as K, X, T, N, KT, Y, joints, including combinations of those basic geometries, with gap and with overlap. In addition, the geometry is not limited to uni-planar but also multiplanar joints are covered, for example KK, TT, XX, YY. The joint can in particular be made between at least two separate structural hollow sections in a truss, lattice, jacket, space frame, space grid or any other form of multi member load carrying structure made of such structural hollow sections.

EXPERIMENTS

Experiments on small-scale specimens of circular hollow section joints 3 are performed in order to evaluate joints 3 that bond steel structural hollow sections 1, 2 together by FRP wrap 4.

For preparation of specimens, fabrics, mats and rovings of glass fibre reinforcement are mixed with vinyl ester resin and wrapped around the steel structural hollow sections 1, 2 to form FRP joints 3 using a hand-lamination process. This can however also be automated. Also, another type of reinforcement fibres and resin matrix can be used.

Dimensions and geometry of the FRP wrap for the small-scale specimens were determined in a preliminary Finite Element Analysis (FEA), using nominal material properties of steel and FRP (given the fibre volume fraction and lay-up of reinforcement layers), and assumed bonding properties.

Figure 2:
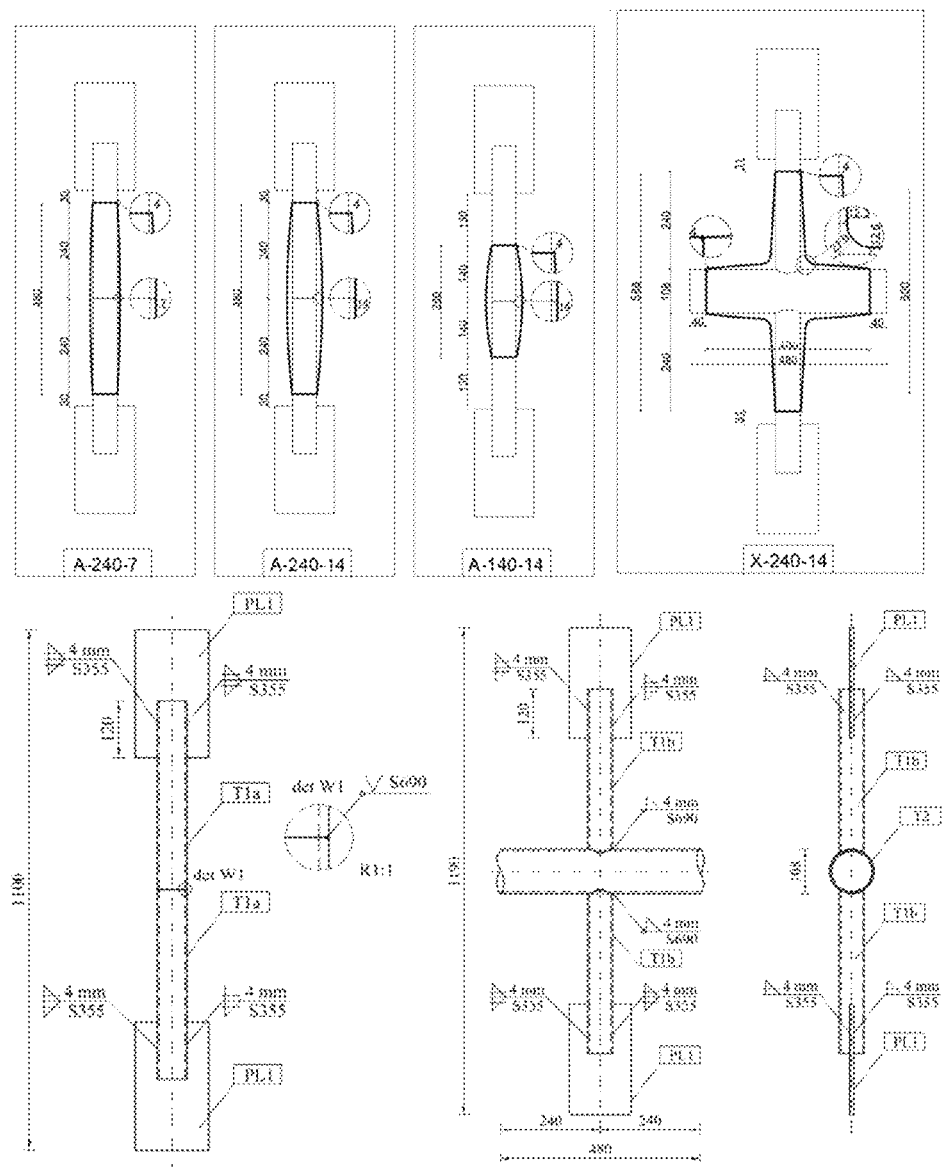
FIG. 2: A geometry of wrapped FRP and welded axial and X-joints of steel structural hollow sections.

Two types of joints with regard to geometry were tested as depicted in FIG. 2:

Axial splice joints of structural hollow section Ø60.3×4 mm, to study behaviour of the joint in generic, axisymmetric, condition.

X-joint of Ø60×4 mm brace member and Ø108×5 mm chord member to study influence of the complex non-uniform geometry of the FRP wrap and adhesively bonded interface surface.

Figure 3:
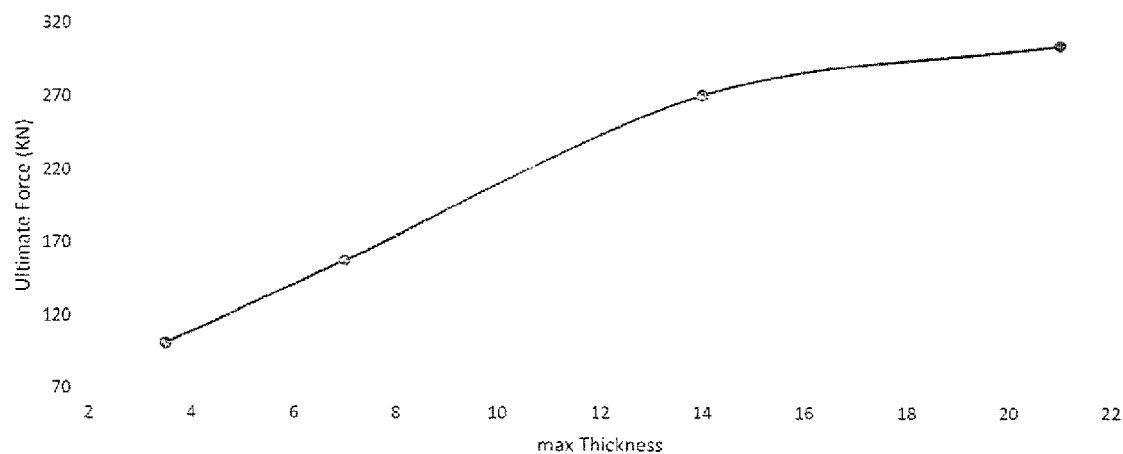
FIG. 3: Results of a preliminary finite element analysis (FEA) on an axial wrapped FRP joint: influence of the thickness of the FRP wrap at the splice joint root on the ultimate adhesive resistance of the joint.

In addition to small-scale specimens of Wrapped FRP joints, specimens with welded joints were tested, as well, in order to compare the performance of the wrapped FRP joints of the invention. Given the geometry of the axial joint and absence of local bending of the structural hollow section wall, the Stress Concentration Factors (SCF) of a welded axial joint is practically equal to 1. However, a bonded FRP joint does experience the shear stress concentration next to the bondline ends, and peel stresses resulting from local eccentricity. The Preliminary FEA on the axial FRP joint indicated that the thickness $t_w$ and the overlap length $L_w$ of the FRP wrap can greatly influence the static resistance of the joint, which is shown in FIG. 3. Therefore, variations of the overlap length and the thickness of the FRP wrap are made in experiments with the axial specimens within three specimen series: A-140-14, A-240-7 and A-240-14.

The length of the overlap in the small-scale specimens varied in the range 140-240 mm, corresponding approximately to the range of 2-4 times the diameter of the steel structural hollow section brace member $d_{sHs}$. The thickness $t_w$ varied in the range 7-14 mm which corresponds to 1.75-3.5 times the thickness of the steel structural hollow section brace member $t_{sHs}$. Such ranges of the relative overlap length and thickness of the FRP wrap $L_w/d_{sHs}$ and $t_w/t_{sHs}$, respectively, were chosen as assumed to be suitable for the case considered in the experiments where glass fibre reinforcement was used to form the wrapped FRP joint of mild steel structural hollow sections with certain slenderness, i.e. diameter-to-thickness ratio, approximately $d_{sHs}/t_{sHs}$=15. For other types of fibre reinforcement of the FRP wrap, such as carbon fibres, and other steel grades or materials used for the structural hollow sections, such as high-strength steels, and other $d_{sHs}/t_{sHs}$ ratios of the structural hollow sections, the ranges of the optimal relative length and thickness of the FRP wrap $L_w/d_{sHs}$ and $t_w/t_{sHs}$, respectively, shall be extended. It is assumed that for the variety of fibre reinforcements, materials and slenderness of structural hollow sections the optimal relative length and thickness of the FRP wrap $L_w/d_{SHS}$ and $t_w/t_{sHs}$ should lie in range of 0.5-5.

Wrapped FRP and welded joints were tested by applying monotonic static and cyclic tensile load to the structural hollow section brace members. Both geometries: axial and X-joint, and both joint types: wrapped FRP and welded, were tested using displacement controlled monotonic static loading until failure on totally 18 specimens: 9 FRP axial, 3 welded axial, 3 FRP X-joints and 3 welded X-joints.

For all the specimens the circular steel structural hollow sections are made from steel grade S355. Two series: WAS and WXS of equivalent specimens with welded axial and X-joints, respectively, were tested in order to compare the results. Over matching welding material S690 is used for series WAS and WXS. Each series of wrapped FRP and welded joint experiments consisted of three identical specimens that were tested.

Force controlled constant amplitude cyclic tensile loading was applied until fracture in the range Fmin=0.1Fmax to Fmax to three FRP and three welded X-joint specimens, X-240-14-F and WXF, respectively. The maximum cyclic load Fmax was assumed approximate Fmax«0.33Fult«no kN, where Fult is the ultimate static resistance of wrapped FRP X-joint (X-240-14). Such load range was chosen according to limited existing experiment data on fatigue of bonded joints in order to reach fracture of the bonded joint within 2 million cycles.

Figure 4:
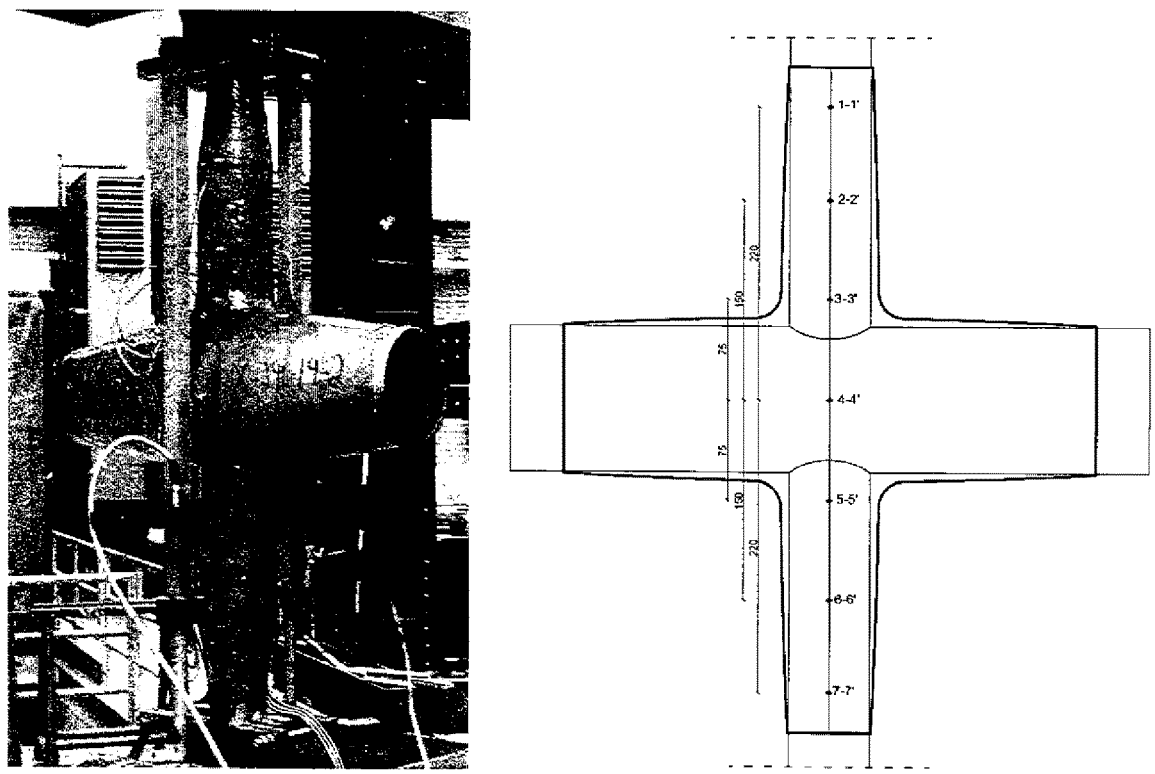
FIG. 4: An experiment set-up in a testing rig showing Linear-Variable-Displacement-Transducers (LVTDs) mounted at the end points of brace members and strain gauges positioned along the wrapped FRP X-joint specimen.
Figure 5:
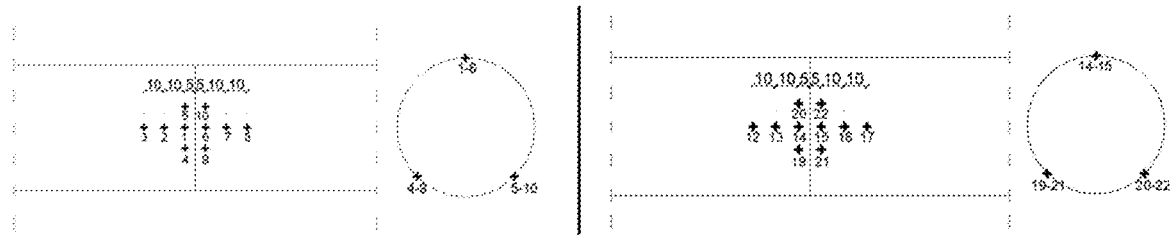
FIG. 5: Strain gauges in the zone of a splice joint root of specimen A-240-14-1: a) strain gauges 1-10 inside the steel hollow section; b) strain gauges 12-21 on the outer surface of the FRP wrap.

Displacements due to an applied load were measured using LVDTs (Linear-Variable-Displacement-Transducers) at both sides of the joint, see FIG. 4, for all the specimens in order to be able to recognize any eccentric load transfer. Several specimens were instrumented with strain gauges oriented in the loading direction, placed on the outer surface of the FRP wrap and in some cases inside the steel structural hollow sections as shown in FIG. 5. Herewith analysis of strain distributions along the joint and detection of slip due to imitation of bondline failure could be identified when a significant difference in the change of strain in the steel hollow section and the FRP wrap emerged. The strain measurements were also used for FEA validation of the experiments.

DISCUSSION OF THE RESULTS

Welded Joints

Figure 6:
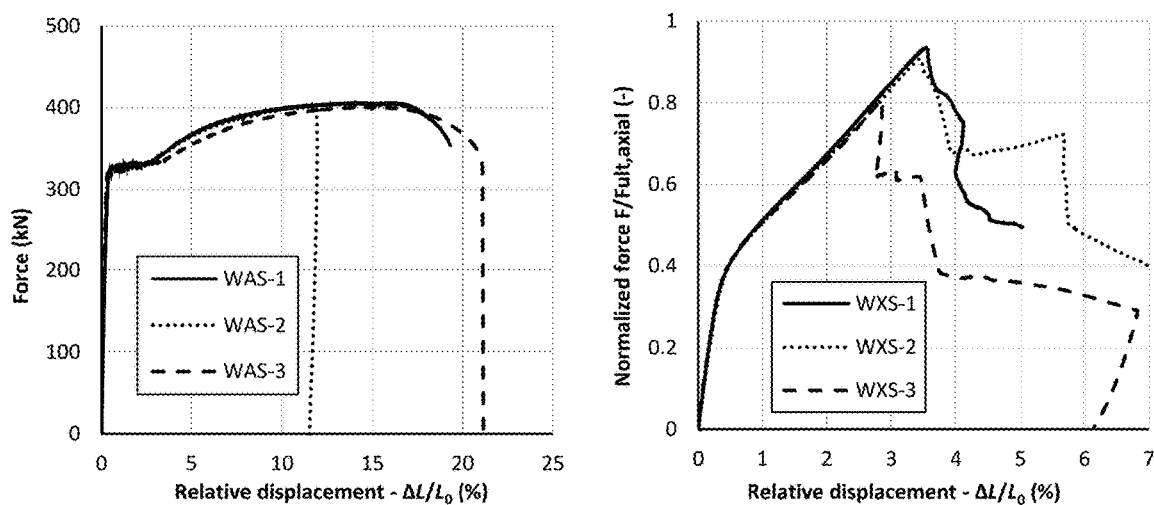
FIG. 6: Force-displacement behaviour of: a) welded axial (WAS) and; b) X-joints (WXS)

First the results of the welded joints are presented. Yield resistance of welded axial specimens was reached at Fy, axial=320 kN, as shown in FIG. 6, corresponding to a yield strength of the brace member made of circular steel structural hollow section (O60.3×4 mm) of fy=458 MPa.

Figure 7:
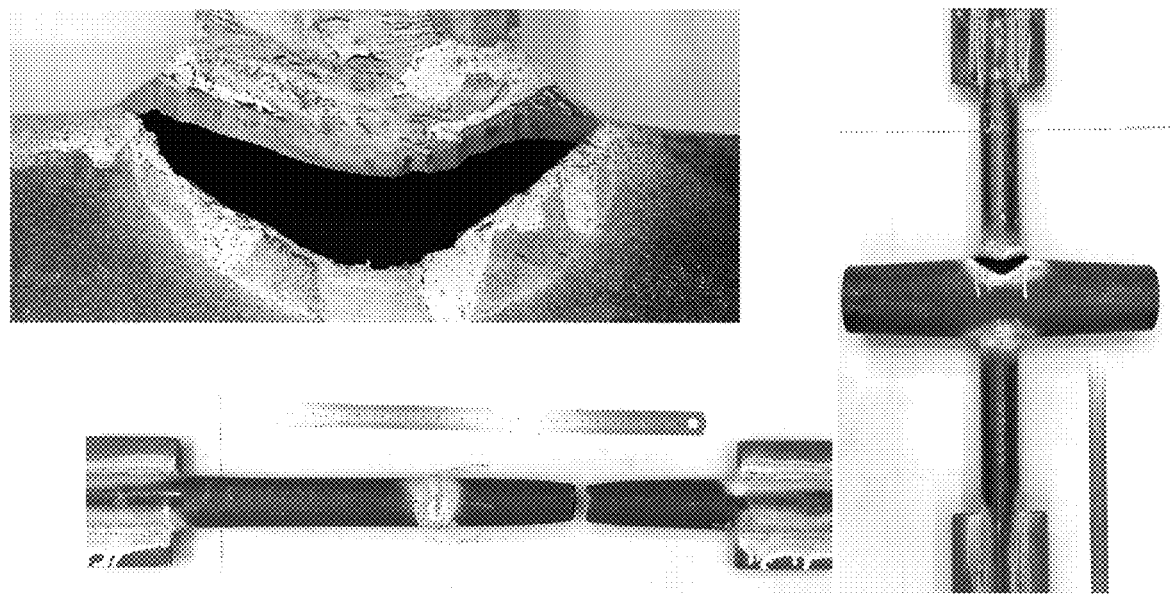
FIG. 7: Failure modes of welded axial (WAS) and X-joints (WXS)

The deformation in FIG. 6a is shown as a relative displacement, i.e. averaged strain, between the end points of the brace members, L0=560 mm, measured by LVDTs on two opposite sides of the specimens. The specimens failed at cross section between the splice (but weld) and the termination plate, as shown in the FIG. 7, because the strength of the welds with overmatching electrodes was much higher than the parent material.

An average ultimate resistance of the welded X-joint of Fult=285 kN was achieved. Behaviour of the three specimens is shown in FIG. 6b where the force is normalized to the yield resistance of the brace member Fy=Fy, axial=320 kN. It can be noticed that at the load level corresponding to approx. 0.35 Fy, the stiffness of the joint is greatly reduced due to yielding and ovalisation of the chord member (Ø108×5 mm). Final chord face failure of the welded X-joints occurred and propagated from the weld toe at chord saddle. The chord face failure of 109 kN is calculated using Table 7.2 from EN 1993-1-8, Eurocode 3: De sign of steel structures—Part 1-8: Design of joints, Brussels: CEN, 2004. This corresponds very well with the yielding point found in experiments 0.35-320 kN=112 kN, see FIG. 6b.

FRP Wrapped Joints

Figure 8:
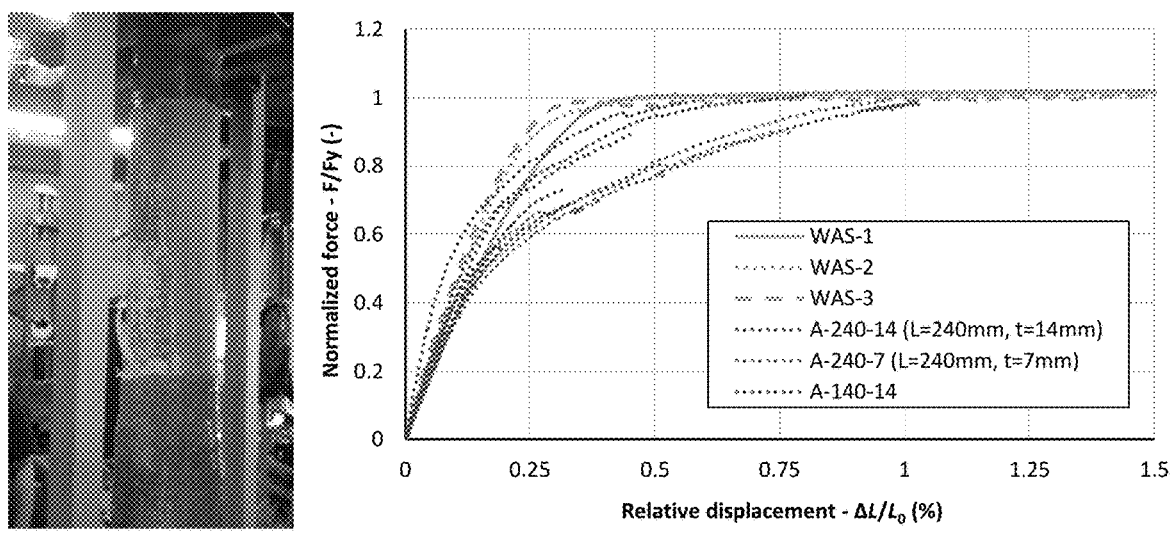
FIG. 8: Slip failure mode of wrapped FRP axial joint and force-displacement behaviour.

All wrapped FRP axial specimens failed by adhesive failure at the bonded interface, see example of A-240-14-1 in FIG. 8a. Behaviour of three series with different lengths and thicknesses of the FRP wrap are compared to welded axial specimens in FIG. 8b.

The force applied to the joint is normalized to the yield resistance of the brace member Fy and plotted against the relative displacement between the end points, excluding the termination plates. It may be concluded that the initial stiffness of the welded and wrapped FRP joints is similar. Very consistent results are obtained within three specimens of each series of wrapped FRP axial joints. Average ultimate resistances of 0.97Fy, 0.96Fy and 0.71Fy are achieved for A-240-14, A-240-7 and A-140-14 series, respectively. The conclusion is that the over lap length has a high influence on the ultimate resistance of the axial joint. The thickness however did not provide a high influence on the ultimate resistance.

Representative force displacement curves of wrapped axial specimens, the ones with minimum ultimate resistance, are compared in FIG. 9. Series A-240-14 show a distinctive change of stiffness at approx. 0.68Fy in FIG. 9*a* which corresponds to an adhesive failure at the joint root. The initiation of adhesive failure is represented by a sudden increase of strains in the FRP and a decrease of strains in the structural hollow section, as shown in FIG. 9*b*, meaning that slip occurred.

Hardening is present between the stage of initiation of the bondline failure at the load level corresponding to 0.68Fy and final failure at 0.89Fy. A possible reason for such favourable behaviour may lie in the fact that the joint is axisymmetric. The circumferential tensile strains generated due to Poisson's effects are larger in the FRP wrap than in the steel hollow section which results in confinement and at the bond inter face. Compressive stresses due to confinement at the interface may provide additional slip resistance due to friction.

Series with shorter and thinner FRP wrap, A-140-7 and A-240-14, respectively, have earlier initiation of failure. The series with 7 mm thick wrapping has reached almost the same ultimate resistance as the one with 14 m thick FRP wrap having a same overlap length of 240 mm. Short series A-140-14 had on the other hand show considerably lower ductility and ultimate resistance, 35% and 27% reduction, respectively.

Wrapped FRP X-joint specimens at the stage after failure are shown in FIG. 10*a*. Adhesive bondline failure mode was governing for two specimens and failure of the FRP wrap has governing for one of the specimens, see FIG. 10*c*. In both cases the delaminations and cracks in the joint root, as shown in FIG. 10*b*, were observed at approximately 50% of the ultimate load. All the specimens reached almost the same ultimate resistance in the range of 0.87Fy to 0.92Fy, see FIG. 11*a*. The complex geometry of the X-joint reduces the ultimate resistance by only 8% compared to the axial joint of same dimensions (X-240-14 vs. A-240-14). Stiffness of the wrapped FRP X-joint is reduced compared to the axial wrapped FRP joint by approximately a factor 2. However, the stiffens of the wrapped FRP X-joint compared to the welded X-joint is increased almost 3 times. This is due to reduced ovalisation of the chord member being stiffened by the FRP wrap.

The elastic range of behaviour of a wrapped FRP X-joint is lower compared to the wrapped FRP axial joint. The initiation of adhesive bondline failure is obtained at range of 0.35Fy to 0.45Fy, which is in average 40% lower compared to axial specimens with a same thickness of the FRP wrap and overlap length (X-240-14 vs. A-240-14). Ductility on the other hand is in creased approximately 92% compared to axial joints.

Figure 11:
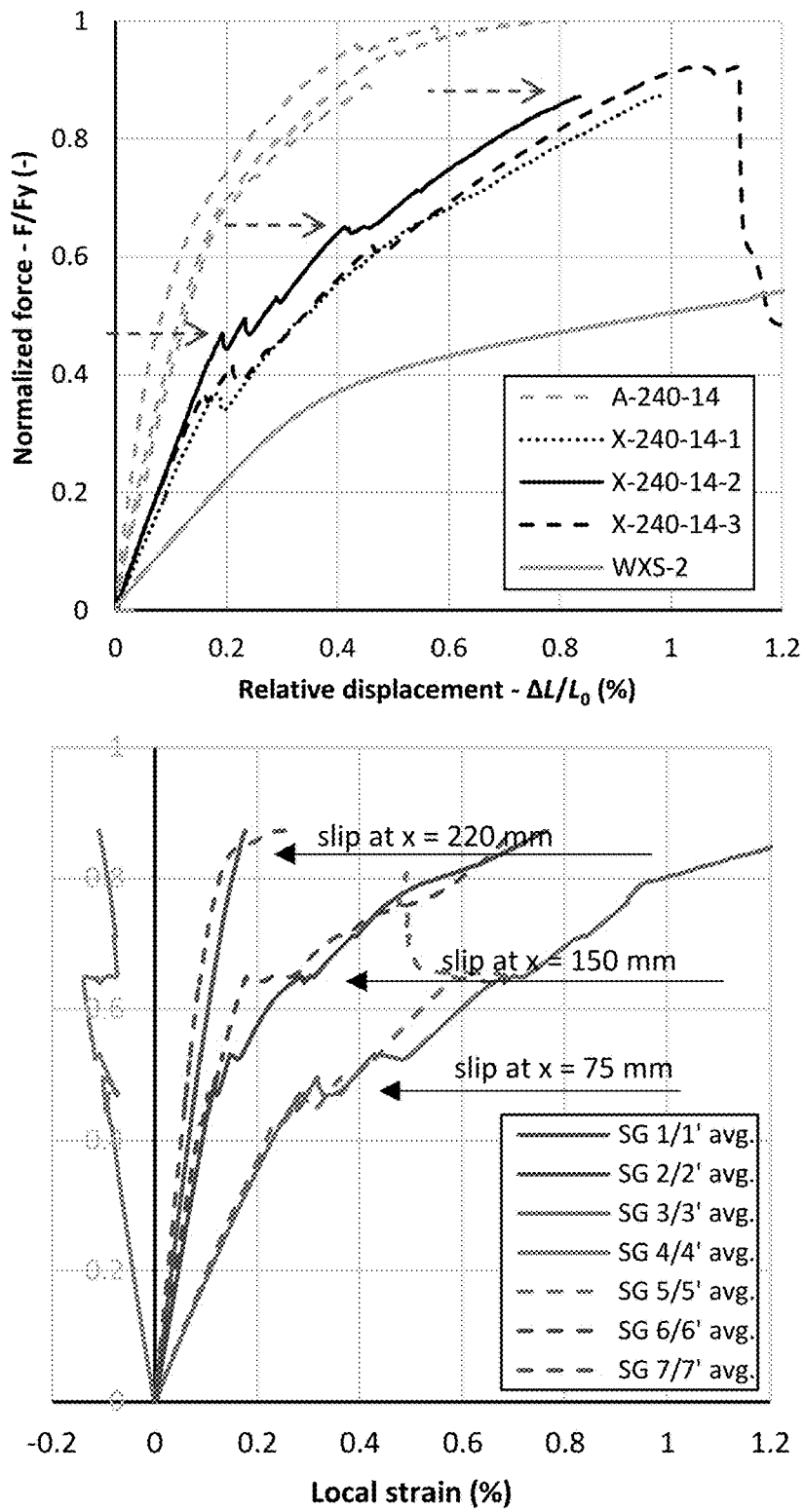
FIG. 11: Results of wrapped FRP X-joints: a) comparison of force-displacement behaviour to axial FRP joints and welded X-joints; b) strains on the surface of the FRP wrap indicating progression of adhesive failure (for strain gauge positions see FIG. 4).

Specimen X-240-14-2 was instrumented with strain gauges according to FIG. 4, to capture the strain development along the length of the joint. Gauges were put symmetrically away from the joint roots on both sides (front and back) of the specimen to reduce the effects of eccentricity in the monitored results. FIG. 11*b* shows the development of local strains as averaged results of front and back strain gauges. The progression of adhesive failure of bondline is indicated by the sudden increase of strains at each location, which happens at different load levels. First the failure initiates at the joint root, at the load level corresponding to 0.45Fy. The adhesive crack propagates to the middle of the brace member (x=150 mm; SG 2/6), at a load level of 0.65Fy. Finally, at x=220 mm, approx. 50 mm away from the end of the FRP wrap, the adhesive crack can be identified at a load level of 0.83Fy. At 0.87Fy the ultimate resistance is reached by bottom brace member visibly slipping out of the FRP wrap. By following the crack propagation in this way it is concluded that the wrapped X-joint possesses significant ductility compared to what is commonly expected form an adhesively bonded joint.

CONCLUSIONS

Static resistance of the wrapped FRP axial joints are in a range of 71%-96% of the yield resistance of structural hollow sections. Variation of thickness and length of the FRP wrap of the axial specimens led to a variation of 20% of the static resistance of the member.

A wrapped FRP X-joint has almost the same resistance as a welded joint, notably an average ultimate static resistance of 89% and 88%, compared to the yield resistance of a structural hollow section brace member.

Adhesive bondline failure mode of wrapped FRP joints shows significant ductility. Hardening is observed leading up to 2 times higher ultimate resistance compared to the load level at which the bondline failure is initiated in X-joints.

Stiffness of the joint region of the wrapped FRP X-joint is increased approximately by a factor 3 compared to a welded joint due to greatly reduced ovalisation of the chord member.

Very good fatigue performance of the wrapped FRP X-joint is indicated in a limited number of tests with cyclic loading. At a stress range corresponding to 140 MPa in the brace member the crack initiation in the FRP wrap happens at approximately 2.5 larger number of cycles as compared to the welded joint. The final failure of the wrapped FRP X-joint was reached at almost 1 million cycles compared to approx. 3.000 cycles resisted by the conventional welded joint.

Although the invention has been discussed in the foregoing with reference to experiments on small-scale specimens embodying the method of the invention for making a virgin joint between two separate structural hollow sections, and embodying such a virgin joint between two separate structural hollow sections, the invention is not restricted thereto and can be varied in many ways without departing from the invention. The discussed experiments shall therefore not be used to construe the present disclosure strictly in accordance therewith. On the contrary the experiments are merely intended to explain the wording of the disclosure without the intent to limit. The scope of protection of the invention shall therefore be construed in accordance with the appended claims only, wherein a possible ambiguity in the wording of the claims shall be resolved using the disclosure of the experiments.

The invention claimed is:

1. A virgin joint between two separate structural hollow sections for assembling a prefabricated lattice tower structure, or for assembling a prefabricated truss structure, made of such structural hollow sections, the virgin joint is fatigue resistant and comprising a fiber reinforced polymer wrap around the structural hollow sections in a transitional area forming a tapered joint, covering and thus bonding together those portions of the two structural hollow sections that, together with the fiber reinforced polymer wrap, form the virgin joint between the two structural hollow sections, wherein the thickness of the wrap is gradually reduced from a maximum thickness at a root of the joint towards the end of the wrap as seen in the longitudinal direction of the hollow section to form a smooth geometry,
   wherein the virgin joint excludes welding, and wherein the joint is an at least uniplanar joint of a K, X, T, N, Y shape, or a combination of these shapes.

2. The virgin joint according to claim 1, wherein the fiber reinforced polymer wrap is applied in a series of sequential lamination steps.

3. The virgin joint according to claim 2, wherein the fiber reinforced polymer of the fiber reinforced polymer wrap comprises a mixture of a thermoset resin matrix with fabrics, mats and/or rovings of a fiber reinforcement.

4. The virgin joint according to claim 2, wherein the fiber reinforced polymer wrap has a length in a longitudinal direction of the two structural hollow sections which is in the range of 0.5-5 times a diameter of the two structural hollow sections.

5. The virgin joint according to claim 2, wherein the fiber reinforced polymer wrap has a thickness measured transversely to a longitudinal direction of the two structural hollow sections which is in the range of 0.5-5 times a thickness of the structural hollow sections.

6. The virgin joint according to claim 1, wherein the fiber reinforced polymer of the fiber reinforced polymer wrap comprises a mixture of a thermoset resin matrix with fabrics, mats and/or rovings of a fiber reinforcement.

7. The virgin joint according to claim 1, wherein the fiber reinforced polymer wrap has a length in a longitudinal direction of the two structural hollow sections which is in the range of 0.5-5 times a diameter of the two structural hollow sections.

8. The virgin joint according to claim 1, wherein the fiber reinforced polymer wrap has a thickness measured transversely to a longitudinal direction of the two structural hollow sections which is in the range of 0.5-5 times a thickness of the structural hollow sections.

9. The virgin joint according to claim 1, wherein the structural hollow sections are made of metal.

10. The virgin joint according to claim 1, wherein the joint has a significantly greater fatigue life than a similar welded joint.

11. The virgin joint according to claim 10, wherein at a stress range of approximately 140 MPa crack initiation of the joint occurs at approximately 2.5 times the number of cycles such crack initiation would occur with a welded joint.

12. A structural frame comprised of multiple interconnected prefabricated lattice tower structures or prefabricated truss structures each made using the virgin joint in accordance with claim 1.

13. A method for making a virgin joint between at least two separate structural hollow sections in a prefabricated lattice tower structure, or prefabricated truss structure, made of the at least two structural hollow sections, the method comprising the steps of:
   applying a fiber reinforced polymer wrap around the at least two structural hollow sections in a transitional area forming a tapered joint, covering and thus bonding together the at least two structural hollow sections, wherein the thickness of the wrap is gradually reduced from a maximum thickness at a root of the joint towards the end of the wrap as seen in the longitudinal direction of the hollow section to form a smooth geometry;
   forming the virgin joint between the at least two structural hollow sections and the fiber reinforced polymer wrap, wherein the fiber reinforced polymer wrap acts as a transition piece for transferring forces between the structural hollow sections, such that welding of the virgin joint between the at least two structural hollow sections is not required; and
   wherein the joint is an at least uniplanar joint of a K, X, T N, KT, Y shape, or a combination of these shapes.

14. The method according to claim 13, wherein the fiber reinforced polymer wrap is applied in a series of sequential lamination steps.

15. The method according to claim 14, further comprising the step of:
   providing the fiber reinforced polymer of the fiber reinforced polymer wrap by mixing a thermoset resin matrix with fabrics, mats and/or rovings of a fiber reinforcement.

16. The method according to claim 14, wherein the fiber reinforced polymer wrap has a length in a longitudinal direction of the at least two structural hollow sections which is in the range of 0.5-5 times a diameter of the at least two structural hollow sections.

17. The method according to claim 14, wherein the fiber reinforced polymer wrap has a thickness measured transversely to a longitudinal direction of the at least two structural hollow sections in the range of 0.5-5 times a thickness of the structural hollow sections.

18. The method according to claim 13, further comprising the step of:
   providing the fiber reinforced polymer of the fiber reinforced polymer wrap by mixing a thermoset resin matrix with fabrics, mats and/or rovings of a fiber reinforcement.

19. The method according to claim 13, wherein the fiber reinforced polymer wrap has a length in a longitudinal direction of the at least two structural hollow sections which is in the range of 0.5-5 times a diameter of the at least two structural hollow sections.

20. The method according to claim 13, wherein the fiber reinforced polymer wrap has a thickness measured transversely to a longitudinal direction of the at least two structural hollow sections in the range of 0.5-5 times a thickness of the structural hollow sections.

21. The method according to claim 13, wherein the structural hollow sections are made of metal.

22. The method according to claim 13, wherein the joint has a significantly greater fatigue life than a similar welded joint.

23. The method according to claim 22, wherein at a stress range of approximately 140 MPa crack initiation of the joint occurs at approximately 2.5 times the number of cycles such crack initiation would occur with a welded joint.

24. A method for making a fatigue resistant virgin joint between at least two separate structural hollow sections in a prefabricated lattice tower structure, or prefabricated truss structure, made of the at least two structural hollow sections, the method comprising the steps of:
   applying a fiber reinforced polymer wrap around the at least two structural hollow sections in a transitional area forming a tapered joint, covering and thus bonding together the at least two structural hollow sections, wherein the thickness of the wrap is gradually reduced from a maximum thickness at a root of the joint towards the end of the wrap as seen in the longitudinal direction of the hollow section to form a smooth geometry;
   forming the virgin joint between the at least two structural hollow sections and the fiber reinforced polymer wrap, wherein welding of the virgin joint between the at least two structural hollow sections is excluded; and wherein the joint is an at least uniplanar joint of a K, X, T, N, KT, Y shape, or a combination of these shapes.

25. The method according to claim 24, wherein the structural hollow sections are made of metal.

* * * * *